Figure 1:
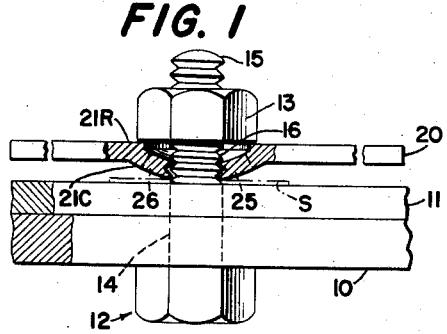

Oct. 7, 1958  W. W. LILLARD  2,855,013
CONTRACTING SCREW THREAD LOCKING MEANS
Filed Aug. 4, 1952

INVENTOR
Wm. W. Lillard

United States Patent Office 2,855,013
Patented Oct. 7, 1958

2,855,013

CONTRACTING SCREW THREAD LOCKING MEANS

William Watson Lillard, Beaumont, Calif.

Application August 4, 1952, Serial No. 302,486

2 Claims. (Cl. 151—3)

The present invention relates generally to screw threads and more particularly to means for fastening female screw thread elements in operative engagement with male screw thread elements as to resist strongly the disengagement of these elements by unscrewing forces.

In the present application hereinafter, the term screw thread couple is to be understood to mean one or more like male screw threads constructed and arranged for cooperative engagement with one or more associated female screw threads. As is well understood by those skilled in screw thread designs, the male elements of a screw thread couple usually fit snugly in a hole having therein cooperative female elements of the couple. I have found in practice that a very small contractile or shrinking action of the female thread elements of a screw thread couple will fasten, i. e. grip the female thread elements to the male elements securely enough to resist rotary disengagement of these elements by a strong unscrewing force applied to either of the screw threads of the couple.

In the present application hereinafter, the term screwthread-locking is to be understood to mean the fastening together of cooperating male i. e. external and female i. e. internal screw threads of a screw thread couple by a contractile movement of at least a portion of the female threads inwardly and forcibly against the male threads. To secure a satisfactory thread-locking contraction of the female screw threads of a couple by heat actuated methods and means has some well known disadvantages even where the screw threaded parts are employed in a device made entirely of metal. Where such a device is made partly or largely of combustible materials, the disadvantages of a heat actuated thread-locking operation are much more objectionable.

An object of the present invention is the provision of methods and means effective at ordinary low working temperatures for permanently locking together cooperating screw thread elements of a screw thread couple.

Another object is the provision of improved means independent of spring temper in the means for permanently locking together cooperative screw thread elements of a screw thread couple.

Another object of my invention is the provision of improved devices for fastening nuts, screws and the like in permanent operative relation to machine elements with which the devices are used.

Still another object of my invention is the provision of improved, economical means for permanently fastening an element of a structure made with screw threads and of a preferred material to another element of the structure made of another material.

In carrying out my invention as embodied in some devices, a piece of sheet metal without spring temper has a centrally located hole or perforation through it with female screw thread elements made in the stock, i. e. material surrounding the hole. Means which constitute an important feature of my invention are constructed and arranged in the piece of material to be operable for strongly pressing at least some of the female screw thread elements i. e. thread flanks, up against male screw thread flank elements on a member with which the sheet metal piece is to be operatively joined or associated.

It is another feature of my invention that the means embodied in the perforated sheet material are integral therewith to make for economy of production and are adapted for use with rod-like screw threaded members of very small diameters or very large diameters and with intermediate diameters; the sizes of the pieces of sheet metal and the perforations varying of course with the diameters of the rod-like members involved.

It is another important feature of my invention that the screw-threaded locking means disclosed hereinafter are operable in many cases when the perforated piece of sheet or plate metal is of one kind of material and the rod-like member is of another kind of material which is not suited to be welded or soldered to the material of the perforated sheet.

Other objects and advantageous features will appear as the description proceeds.

Referring to the drawings which form a part of the specification:

Figure 1 is a side view, partly broken away, of two elements of a structure to be held together by a machine bolt and nut, of well known construction, and a lock washer device embodying certain features of my invention.

Figure 2:
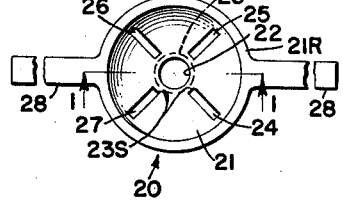
Figure 3:
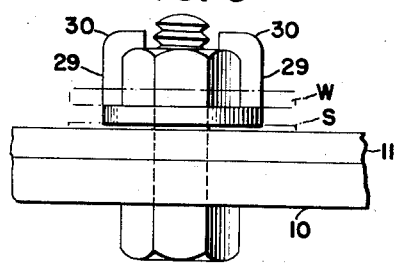

Figure 2 is a partial top view to varying scales of lock washer elements of Figure 1. Figure 3 is a partial side view of the elements of the Figure 1 structure shown in final operated positions. Figures 1 and 3 may also be considered operational views for illustrating certain methods of operation relating to my invention.

Figure 4:
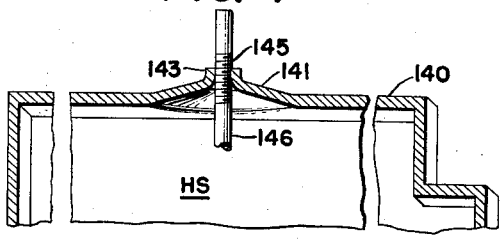
Figure 5:
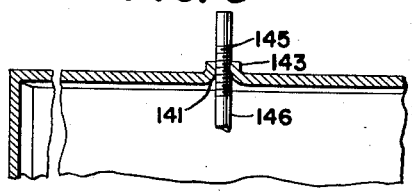
Figure 6:
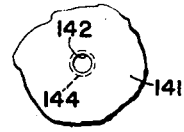
Figure 7:
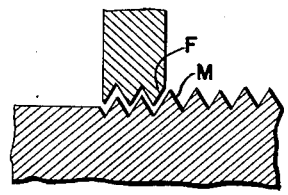

Figure 4 is a perspective schematic view, partly broken away, of a sheet metal housing structure with a rod in initial assembly position projecting through a perforated wall element of the structure adapted for fastening the rod therein according to a feature of my invention. Figure 5 is a partial perspective view of the structure of Figure 4 illustrating the final work position of the rod relative to the structure. Figure 6 is an elevational view of a portion of the wall element of Figure 4 around a threaded perforation especially adapted for coaction with a threaded rod to be fastened later in the wall of the structure. Figure 7 is an enlarged, cross-sectional schematic view of portions of the Figure 1 structure illustrating relative positioning of male and female screw elements before operations are begun to carry out my invention.

Figure 8:
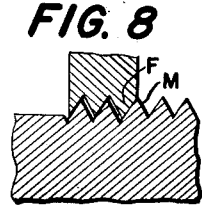

Figure 8 may be considered as illustrating the structure of Figure 7 after my thread-locking invention has been carried out.

It will be understood by those skilled in the art that the term "snug fit" as it pertains to ordinary machine screw threads does not mean as close or tight a fit as that term is ordinarily held to mean as when it is applied to a round rod rotatively mounted in a round hole in a fixed metal part. Also, it is to be understood that for the purposes of disclosing this invention, a "snug fit" is to be considered a looser fit than that kind ordinarily known as a "tight fit." And a tight fit is ordinarily a looser fit than a so-called "shrinkage fit." As will appear hereinafter as the description proceeds, the present invention provides means and methods for obtaining a substantial equivalent of a "shrinkage fit" of a washer-like device around a threaded rod device.

For illustrative purposes, in Figure 1 is shown parts of two metal plates 10 and 11 fastened together by a bolt 12 and a nut 13 of well known construction, the bolt having a shank portion 14 which passes through holes in the plates. An outer end portion 15 of the shank 14 may have screw threads 16 therein of a well known kind. A washer-like member 20 of suitable sheet metal without spring temper may include a central body portion 21 having a shallow concavo-convex or bowl-shaped formation to be described further hereinafter. An outer rim portion 21R of the body 21 may have a thickness greater than that of the remainder of the body portion 21 nearer the center. In some cases, the rim portion 21R may for advantages to appear be made of a different and stronger metal than that of the remaining part 21C of the body portion 21.

A centrally located hole 22 through the body portion 21 may have thread elements 23 for fitting snugly about the threads 16 on the bolt shank 14. The threads 23 are preferably made in most cases after the washer member 20 has been given its slots and bowl shape. This shaping and slotting ordinarily will be done by a stamping or drop forging operation of a well known kind. In some cases, as with washer members of extra large size and thickness, the holes 22 may need be made by drilling operations.

For purposes presently to appear, four (or more) narrow radial slots 24, 25, 26 and 27 ninety degrees apart, may be made entirely through the stock of the body 21 and extend from points near the screw thread elements 23 to points adjacent the rim portion 21R. In most cases, the slots 24 et seq. will extend considerably nearer the threads 23 than the rim element 21R for advantages to appear hereinafter. In some cases, as in extra small washers 20, the number of slots 24 et seq. may be less than four. Also, in some cases, the slots 24 et seq. may be replaced by slits (not shown).

On the sides of the body 21, integrally joined thereto, may be provided two or more nut engaging fingers 28. In some cases, these fingers 28 may be satisfactorily replaced by short pieces of wire (not shown) fastened to the body 21 in any well known way.

In practicing my invention with the structures shown in Figures 1, 2 and 3, after the bolt 12 is passed through the holes in the plates 10 and 11, the washer member 20 is ordinarily screwed up against the plate 11 and then the nut 13 is screwed up against the rim portion 21R when the nut is big enough in diameter to engage against the rim portion. If the nut 13 is not large enough to engage against the rim portion 21R, then a plain thick washer W of well known construction may be put around the shank of the bolt before the nut is put in starting position. The washer W is removed after the member 20 is flattened.

If no washer is required, the nut 13 is screwed up until it engages against the rim portion 21R and then advanced with force enough to begin to flatten approximately the bowl-shaped central portion 21 between the nut 13 and the plate 11.

The rim portion 21R is strong enough to resist internal expansion, i. e. stretching forces of relatively large magnitude. Therefore the thread-carrying inner end portions of the sector-shaped areas of the body 21 (areas between slots 24—25, 25—26, 26—27 and 27—24) are subjected to a strong urging to move inwardly as the flattening of the bowl-shaped body 21 is done. Eventually the screw thread elements 23 in the sector-shaped areas will be pressed very tightly against the thread elements 16 on the bolt shank 14. Thereafter, when the nut 13 is fastened to the washer 20 in ways presently to appear, to rotate the nut 13 and washer 20 by any unloosening i. e. rotation of the nut 13 will require a much stronger force than will ordinarily be transmitted to the washer by the nut under severe service conditions.

The provision of the slot-separated sector-shaped areas in the body 21 besides assuring a positive, inward, thread-locking movement of the threads 23 also helps to provide that slight manufacturing variations in the dimensions of the threads on the bolt shank 14 and in the body 21 will be of little hinderance to the thread-locking movements of the threads 23 because of permitting one sector area of the body to be moved a slight amount more or less than another adjoining sector area when that is required. It will be understood that the slots 24 et seq. will terminate so as to leave stock 23S for cutting the threads 23 near i. e. across the slots' inner ends.

It will be understood that for the purposes of the present invention the lock washer member 20 may be flattened after it has been screwed on the shank 14 by any suitable, well known means instead of by the means described hereinbefore. After the washer has been flattened and the nut 13 screwed on tightly, the fingers 28 may be bent inwardly to have portions 29 thereof disposed closely against the sides of the nut and outer end portions 30 of the fingers bent down closely against the outer face of the nut. It can be readily seen that if desired the fingers 28 may be made longer and secured one to the other as by twisting in a well known way (not illustrated) to be disposed against the outer face of the nut 13. Also, if the fingers 28 be omitted, they may be replaced by such well known devices as short pieces of wire (not shown) which can be fastened together as by twisting to be disposed against the outer face of the nut 13 as to prevent its accidental loosening or removal.

As is well understood by those skilled in machine design, it is sometimes desirable or even essential to fasten two parts of a machine in permanent close relation, one to the other, by means which permit one of the parts to be movable angularly in a plane parallel to the plane of the other part. One feature of the present invention is well adapted for securing such a result. For illustration, by inspection of the structures of Figures 1 and 3, it can be seen that the part 11 need not be forced tightly against the part 10 by the lock washer 20 in its final position when such is desirable to permit one of the parts 10 or 11 to be moved angularly around the bolt shank 14 with respect to the other of these parts. As illustrated in Figure 3, the washer may be flattened against a very thin sheet S of suitable, removable material such as a sheet of thin firm paper (thickness exaggerated in Figure 3) which can be easily torn away later. Obviously, the paper sheet S may be omitted and the washer 20 made to bear tightly against the plate 11 while being flattened when such is desirable.

In Figures 4, 5 and 6 is illustrated how a feature of my invention may be carried out for economically and rigidly securing a rod in a wall of sheet metal housing for a device such as a plaything for example, where low cost of production is especially important. In a thin, metallic wall 140 of a housing structure HS (shown in part), a cone-like formation 141 of relatively large diameter in proportion to its height, i. e. dimension along its axis, is made with a hole 142 through the wall at the center of the cone formation. A bead or lip element 143 is preferably provided around the hole 142 as indicated in Figures 11 and 12. In the lip, screw threads 144 are made for engagement with screw threads 145 on a rod 146 to be fastened in the wall 140.

After the threaded rod is screwed into the hole 142, the cone-like formation may be flattened while holding the rod in a perpendicular relation to the wall 140. The rod 146 will be gripped by the wall 140 in a way similar to that described hereinbefore as to the structures of Figures 1 and 3.

With reference to the showings of Figures 7 and 8, these views are intended to emphasize that the female screw thread elements F move directly toward and up against the male screw thread elements M as the invention is carried out. In other devices proposed for securing a nut on a bolt, i. e. a lock washer or lock nut, as far as applicant is aware, these other devices moved some of the thread elements along the axis of the threaded part involved to jam them against other thread elements and thus secure only an increase in the friction between the male and female screw elements which existed only as long as an impermanent spring tempered piece of relatively small metal held its resilience to a large extent.

It will be understood that the perimeter of the hole through the disc-like member of my thread-locking devices may take the form of a complete circle with screw thread elements formed by a well known tapping operation, or the perimeter may be similar to that of the opening through a nut with interrupted screw threads of a well known kind and be made by a stamping operation with the screw thread elements disposed in a spiral path adapted for cooperative engagement with ordinary screw threads on a bolt or the like of well known construction. The perimeter of the thin metal body of my thread-locking device may have the form of a circle, hexagon, square or rectangle. It will be further understood that in connection with the central portion of the body irrespective of the contour, i. e. form of its outer edge, the term "bowl-shaped" means a shape having a cross-section approximately concavo-convex, or similar to that of a hollow, inverted, truncated cone with an integral closure element at the small end. In either case, the depth of the bowl-shaped portion will ordinarily be relatively small as compared to the diameter of the bowl-shaped central portion.

With regard to the problem of determining the depth of the bowl-shaped portion of a thread locking device according to my invention, the following should be noted. Such depth will ordinarily be determined by consideration of the diameter of the bowl-shaped portion 21 and the clearance between the thread elements in the hole 22 and the corresponding thread elements on the bolt-like member with which the thread-locking device is to be used. Ordinarily, it will be satisfactory to give the bowl portion a depth that will result in securing, on test, a satisfactory strong grip of the threaded sector-like elements of the device on the bolt when the bowl-shaped portion 21 is fully flattened, i. e. disposed approximately in a plane. Such a grip of the thread-locking device is thus obtained by a toggle-like action, in effect, of two or more pairs of integral, sector-shaped elements of the bowl-shaped portion 21, the elements of each pair being oppositely and cooperatively positioned across the center of the portion 21 in similarity to a certain extent to oppositely disposed bars of a toggle-joint of well-known construction.

Certain of the advantages of the present invention will appear from a reading of the foregoing description. Other advantages arise from the provision of a lock washer device which may serve as a nut that can automatically lock itself on a bolt without the presence of another nut or washer. Other advantages arise from the provision of a lock washer which it is practicable to make from metal without spring temper and which is very resistant to corrosion. Still other advantages arise from the provision of a practicable means for locking screw threads of very large size on one part to other large size cooperating screw threads on another cooperative part.

Another of the advantages resides in the provision of a practicable means in the form of a lock washer or a lock nut for machine screws or bolts of a very small size. Another important advantage resides in the provision of a lock washer having an arrangement of parts which coact to provide a toggle-like, extra strong grip on a threaded bolt member with which the lock washer is employed.

Another important advantage arises from the provision of a plurality of pairs of toggle-like arms arranged to be effective for employing the principle of the toggle press for pressing thread elements on the washer into extra tight engagement with thread elements on an associated bolt or the like. The use of such toggle-like arms is made practicable by integrally connecting each arm at its inner end to the two adjacent arm ends by a small portion of metal stock, the presence of which makes it possible to thread the inner ends of the arms with continuous screw threads, and to maintain such continuous threads in operative condition until they are engaged with threads on the bolt or like with which the washer is to be used.

It is to be understood that the drawings which show various structures that embody certain features of my invention are illustrative mainly and are not to be considered as showing the only possible embodiments of my invention.

Portions of the improvements disclosed may be used without others, and variations may be resorted to within the scope of the appended claims.

Having described my invention, I claim:

1. As a new article of manufacture for use with a threaded rod-like part, a lock washer device including a substantially circular body element of flexible metal plate without spring temper, a circular bowl-like integral portion of said body centrally disposed relative to the periphery of said body, a peripheral portion of said body extending materially beyond the outer edge of said bowl at all points, said peripheral portion having a greater thickness than said bowl portion and forming a rim element thereof, said bowl portion having a centrally disposed tapped hole through its bottom, the threads in said hole being adapted for engagement with a loose working fit with the threads on said rod-like part, said bowl portion having at least four equidistant radial slots through its bottom extending from points near said tapped hole toward said rim and terminating considerably farther from the inner edge of said rim than from said tapped hole, said slots dividing said bowl portion into at least two pairs of toggle-like arm elements, the arm elements of each pair being operatively disposed, one opposite the other, across said tapped hole, the bottom of said bowl portion being initially disposed at one side of the plane of said rim a predetermined distance that renders said toggle-like arms effective to move the threads in said tapped hole inwardly enough to be tightly engaged with the threads on said rod-like part, as said arms are flattened.

2. The structure described in claim 1 modified by the metal between the inner ends of said slots and said tapped holes being only slightly more measured along radial lines than the depths of the screw threads in said tapped hole.

References Cited in the file of this patent

UNITED STATES PATENTS

| | | |
|---|---|---|
| 293,295 | Agnew | Feb. 12, 1884 |
| 916,421 | Crittenden | Mar. 30, 1909 |
| 945,127 | Kollenberg | Jan. 4, 1910 |
| 1,126,531 | Liebmann | Jan. 26, 1915 |
| 1,173,959 | Hayes | Feb. 29, 1916 |
| 1,391,378 | Gaston | Sept. 20, 1921 |
| 1,465,221 | Joy | Aug. 14, 1923 |
| 1,785,924 | Wilson | Dec. 23, 1930 |
| 1,927,389 | Castner | Sept. 19, 1933 |
| 1,992,272 | Wilson | Feb. 26, 1935 |
| 2,177,191 | Sandberg | Oct. 24, 1939 |
| 2,486,723 | Thompson | Nov. 1, 1949 |

FOREIGN PATENTS

| | | |
|---|---|---|
| 494,094 | Great Britain | Oct. 17, 1938 |